United States Patent [19]
Chartet

[11] 3,941,293
[45] Mar. 2, 1976

[54] BRAZING JIG FOR ALUMINUM RADIATOR CORES

[75] Inventor: Andre Chartet, Meudon, France

[73] Assignee: Societe Anonyme des Usines Chausson, Asnieres, France

[22] Filed: Feb. 28, 1974

[21] Appl. No.: 447,022

Related U.S. Application Data

[62] Division of Ser. No. 372,945, June 25, 1973, Pat. No. 3,880,578, which is a division of Ser. No. 69,593, Sept. 4, 1970, Pat. No. 3,769,675.

[30] Foreign Application Priority Data

Sept. 22, 1969 France............................. 69.32199

[52] U.S. Cl. ... 228/44.1 R; 29/157.3 R; 29/157.3 B; 228/183; 269/287; 269/296; 266/5 R
[51] Int. Cl.².................... B23K 37/04; B21D 53/02
[58] Field of Search ...................... 228/4, 6, 44, 183; 29/202 R, 157.3, 157.3 B; 269/287, 321 W, 240, 296; 432/253, 258; 266/5 R, 14

[56] References Cited
UNITED STATES PATENTS

| | | |
|---|---|---|
| 2,023,354 | 12/1935 | Cope.................................. 228/44 X |
| 2,230,310 | 2/1941 | Sammon et al................. 432/253 X |
| 2,776,128 | 1/1957 | Nesbitt et al................. 266/5 R UX |
| 3,136,038 | 6/1964 | Huggins et al. ................ 29/157.3 B |
| 3,181,858 | 5/1965 | Daniels............................... 269/296 |
| 3,456,331 | 7/1969 | Holden ............................ 29/498 X |
| 3,726,466 | 4/1973 | Vedder et al......................... 228/44 |

*Primary Examiner*—Francis S. Husar
*Assistant Examiner*—Gus T. Hampilos
*Attorney, Agent, or Firm*—Imirie, Smiley & Linn

[57] ABSTRACT

The process is characterized in that hot gas are blown at right angle with the front face of the parts to be brazed into the contiguous areas of an enclosure. The speed of the hot gas in a first area is regulated in order to ensure pre-heating, the speed in a second area is regulated in order to increase the temperature to the brazing temperature and the speed in a third area is regulated in order to ensure at least a partial cooling of the parts before they are withdrawn from the enclosure.

9 Claims, 11 Drawing Figures

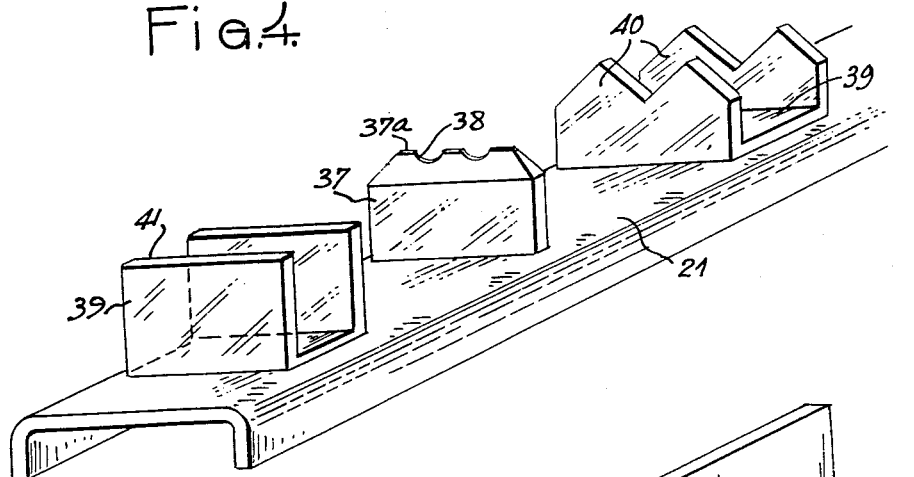
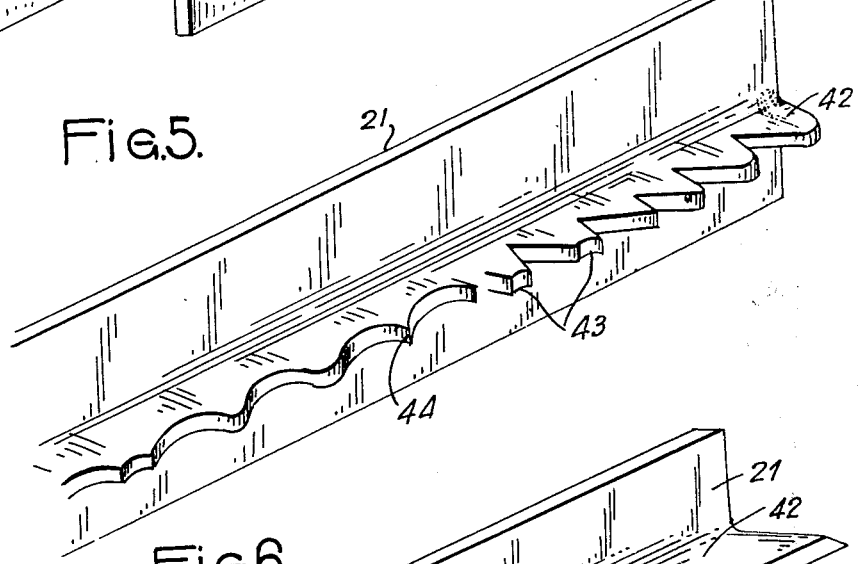
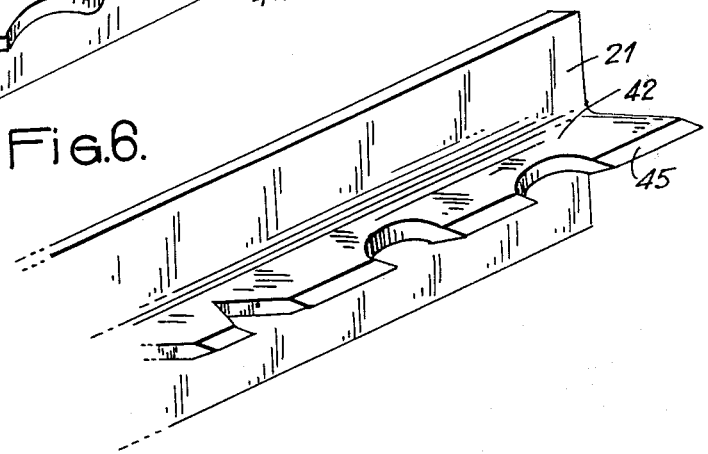

BRAZING JIG FOR ALUMINUM RADIATOR CORES

This is a division of application Ser. No. 372,945, filed June 25, 1973, now U.S. Pat. No. 3,880,578, which is a division of application Ser. No. 69,593, filed Sept. 4, 1970, now U.S. Pat. No. 3,769,675.

BACKGROUND OF THE INVENTION

This invention relates to a novel process for the brazing of radiator cores all the parts thereof are made of aluminium or aluminium alloys and a part at least thereof are plated with a brazing alloy.

The invention relates to a non-stop brazing process, which means that the cores to be brazed are moved according to a strictly continuous motion or according to an intermittent but regular motion, and this with the use of hot gas instead of dipping the radiator cores into a melting salt bath.

Brazing by means of hot gas entails however some inconveniences which are well known. As a matter of fact, hot gas used must never be at a temperature above melting temperature of aluminium. Now, melting temperature of brazing alloys, particularly that of silicon-aluminium, is about the same as that of aluminium melting temperature (difference of about 30° to 40°C). On account of this small difference between the respective melting temperatures of aluminium and of brazing alloys thereof, the heating of parts, about the end of the heating, tends to an asymptote so that the end of the heating stage has to be long in order to reach regularly the brazing temperature.

It has been verified that the keeping of thin aluminium parts at a temperature close to brazing temperature is prejudicial to the making of good brazings, due to the flux covering inevitably the parts to be brazed is quickly damaged at high temperatures and there is a great risk that aluminium will reoxidate as a result of high temperature and the presence of oxygen in the hot gas.

Because of the large number of soldering joints involved in the manufacture of a radiator — a few hundreds or even a few thousands — it is also essential that all the joints be perfectly made, which requires that all the radiator parts in process of brazing be heated, at the same time, at the same temperature.

Another serious inconvenience lies in the fact the brazing being carried out at a temperature close to the melting temperature of aluminium, it follows that the metal when at a temperature close to said soldering temperature shows only extremely low strength characteristics, while, besides, all the radiator parts must remain pressed one against each other. Thereby, radiator manufacturers were heretofore fixed on the horns of the following dilemna: either tighten the parts and run the risk of the strain thereof when the metal softens, or to leave the parts loose which will not still prevent the straining thereof, and, consequently, to be no longer in contact one against the other which, as a result, making impossible the working out of brazing joints.

This problem becomes more complicated also with the expansion the core parts are subjected to, when heated at brazing temperature. Said expansion is, in fact, important and tends to create a play between the parts.

Another difficulty lies in the fact that the core, which must be tightened in a fitting, is necessarily in contact with said fitting. The holding fitting having to be rigid at brazing temperature is thus necessarily thick and the heating thereof, apart from the fact of its cost, is slow as compared with that of the core which results in the cooling of the core areas in contact with said fitting and a risk of faulty soldering close to said areas notwithstanding a tendency for the flux covering them to flow out towards the warmer parts of the core, where it may overflow and thereby pour too much soldering alloy into the aluminium which may perforate certain parts of the pieces. Moreover, the amount of flux may then be insufficient on certain areas of the parts.

The invention has been conceived and developed to provide means for brazing radiator cores with high efficiency and to ensure an improved brazing of all the joints.

According to the invention, the radiator cores, after being covered with flux, are moved into the successive areas of an enclosure, contiguous streams of hot gas directed at right angles to the front surface of said radiators are blown into each of said areas so as to create by themselves aerodynamic deflectors for the travelling of said streams in all the parts thereof, the velocity of a hot gas stream in one of the areas forming a pre-heating area is adjusted so as said velocity is just under the velocity limit at which the flux would be blown and carried away, the velocity of the hot gas stream in the next area wherein the cores are heated at soldering temperature is adjusted at a higher velocity than that prevailing in the pre-heating area, and one other area at least is arranged wherein the cores are cooled down at a temperature ranging about 300°C before they are withdrawn from the enclosure.

The practical implementing of the invention has disclosed that additional inconveniences had to be overcomed. In particular, the moving of the radiator cores requires a travelling device capable of supporting the heat of the successive gas streams, as well as the corrosion resulting from flux vapours or being at least partly protected from said vapours. Moreover, the operation of said travelling device must obviously not disturb the travelling of said gas streams and the leakages of the latter must also be as low as possible.

This invention also answers this problem and provides an equipment for the implementing of this process.

According to this second provision of the invention, the equipment includes a number of cells externally similar as concerns the width and the height thereof, said cells including, in the aperture of the frame they delimit, two sole-plates or pillar-plates substantially parallel, one of which is fixed and the other is movable so as it may travel cross-wise to the lengthwise direction thereof, the front parts opposite said sole-plates or pillar-plates being fitted with thin edge projections between which the radiator core is gripped, so that said cores are only connected to said cell pillar-plates at a certain distance from said pillar-plates and so that by means of spot junctions leaving clear the whole of the front surface thereof, said cells being suspended and moved in an air furnace including at least at the inlet and the outlet thereof a chamber locked by the cells upon the passage thereof, said furnace being connected with separated blowing and exhausting means for at least three air streams having different velocities and delimiting pre-heating, brazing and precooling areas which are connected between them without break of continuity.

BRIEF DESCRIPTION OF THE DRAWINGS

FIG. 4 is a perspective view, at a larger scale, showing a specific feature of brazing cells;

FIGS. 5 and 6 are perspective views showing particular embodiment details;

DETAILED DESCRIPTION OF THE INVENTION

Figure 1:
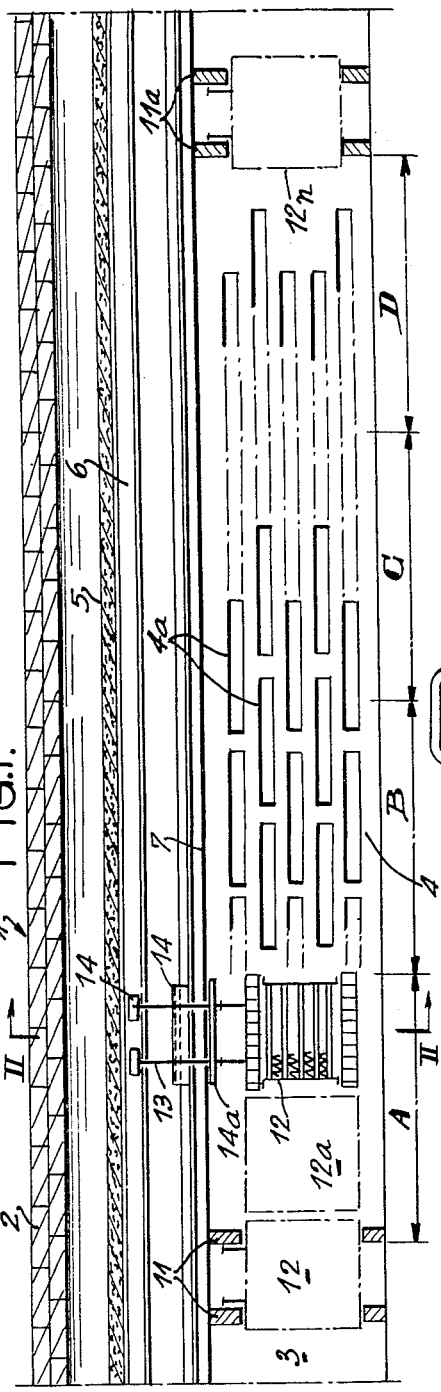
FIG. 1 is a diagrammatic sectional elevational view of a furnace designed for implementing the invention.
Figure 2:
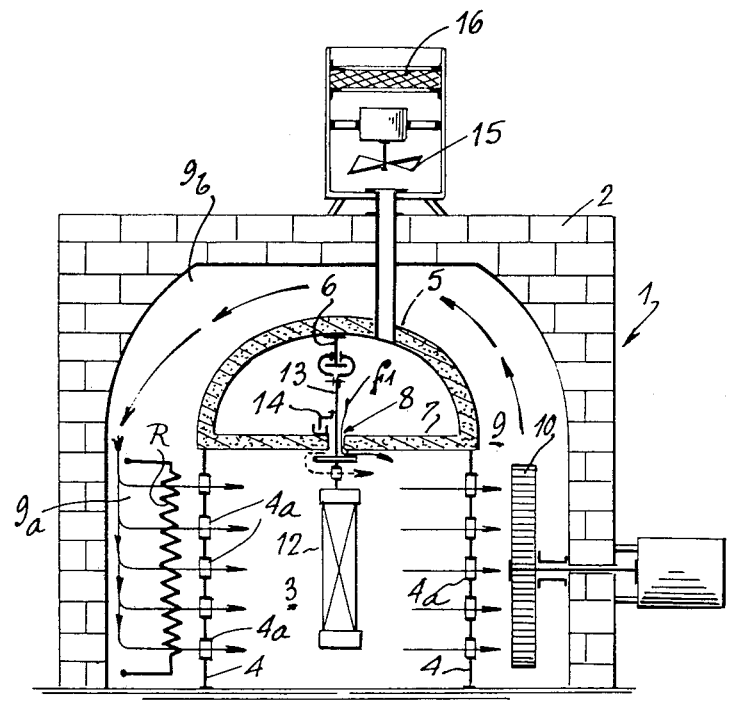
FIGS. 2 and 2a are cross sectional views taken substantially as indicated by line II—II of FIG. 1.

As shown by FIGS. 1 and 2, the furnace is made of a long shaped structure 1 provided with heat insulated material 2. An enclosure 3 is delimited in the structure 1 by partitions 4 which may be partly or entirely made of ceramic or stainless metal, for example stainless steel, so as to resist corrosive effects of vapour and/or projection of highly active flux products which are generally used for brazing of aluminium. As shown on FIG. 2, partitions 4 hold an insulated duct 5 which shuts the top part of the enclosure 3 and forms a conveyor or transporter 6 which may be made of a single rail or of an axially mobile unit of the type currently used in handling technics. Duct 5, and particularly the bottom part 7 thereof forming the top part of enclosure 3, is heat insulated and said bottom part 7 bears a narrow lengthwise groove 8.

Partitions 4 form with structure 1 ducts 9, 9a connected by a duct section 9b. Partitions 4 are, besides, punched with port-holes 4a which are spaced so as to provide an even travelling of hot gas streams transversally to the axis of the enclosure 3, said travelling being created by turbines or fans 10 set, for instance, in duct 9. The heating of the air contained in the structure may be ensured by various means, by electric resistances 11, for instance, set into duct 9a, by town gas burners or fuel burners, said heating means being in any case properly controlled so as to obtain the temperatures hereinafter specified.

The setting of turbines 10 and port-holes 4a and, in case of need, of means for the distribution of the gas flux blown by the turbines, is so fixed as to create in enclosure 3 successive areas wherein hot gas travel at different temperatures and velocities along gaseous streams not separated between each other by partitions projecting in said enclosure. In other words, it has been found desirable that the successive hot gas streams be delimited by aerodynamic means exclusively in enclosure 3, properly so called.

Chambers 11 and 11a are however set at the inlet and outlet of enclosure 3 in order to cut down hot gas losses.

The furnace is intended to house cells 12, 12a ... 12n which are all identical externally at least as concerns the height and the thickness thereof. In the case conveyor 6 is a mere fixed rail, then, as shown on FIG. 1, cells 12, 12a and so on are in mutual contact and push themselves one and another whether or not they are loaded with a core or a radiator to be brazed. On the contrary, in the case transporter 6 is mobile itself, this arrangement, though advantageous, is no longer necessary.

In the embodiment shown on FIG. 2, conveyor 6 is set in duct 5, and cells 12 are carried by suspension parts 13 having a small section which run through groove 8 of bottom part 7. Suspension parts 13 may be fitted with deflector units 14, 14a respectively set on either parts of bottom 7 so as to limit the amount of gas outflowing from duct 5 and entering into enclosure 3. It has, in fact, been found advantageous to maintain the inside of duct 5 under a slight over-pressure as compared with enclosure 3 by blowing, into said duct, air from a feeding device 15 fitted, if necessary, with a filtering, dehydrating and pre-heating device 16. Thereby, the inside of duct 5 which is thermally insulated from enclosure 3 and ducts 9, 9a, 9b, is at a temperature definitely lower than that of the latter hollows and the air it contains is free of flux vapour, which makes it possible to use a simple conveyor that cannot be damaged by corrosive products or by heat. It appears, moreover, that the air entering into enclosure 3 is lead in the direction of arrow $f_1$ by shutters and deflectors 14 and 14a so that the air vein travelling through cell 12 is not cooled neither disturbed.

Figure 2A:
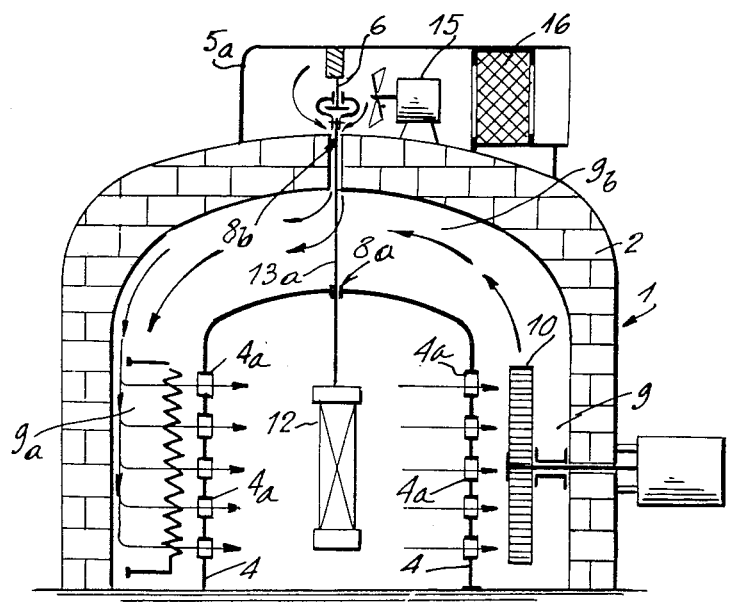

A similar result is obtained by the embodiment shown on FIG. 2a according which duct 5a is built on the top part of the furnace and houses both the conveyor 6 and the air supply device 15. In this case, parts 13 which hold the cells are longer and run both through the top part of enclosure 3 and the furnace wall respectively through slots 8a and 8b. Shutters and deflectors 14, 14a of FIG. 2 may then be suppressed.

Figure 3:
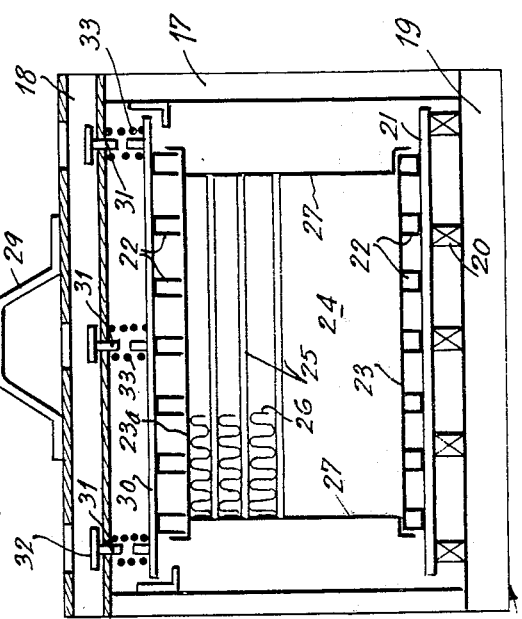
FIG. 3 is a diagrammatic elevational view, fragmentary sectional, of an embodiment of one of the brazing cells travelling in the furnace shown on the above FIGS.

FIG. 3 shows an embodiment of cells 12 which each include a rectangular frame 17 made for instance of stainless square tubes 18, preferably of stainless steel, for instance of Ugine NS 24 steel, and the parts of said frame are joined together by boxing preferably, or also by welding provided that the welds be so made that they will not corrode more than the constituent metal of the frame. Such welding may be carried out in some instances by resistance, but, most often it has to be made under a neutral or reducing atmosphere, or also, under vacuum, preferably by means of electron beams.

The thickness of the frame and the height thereof correspond to the gaps worked out into chambers 11 and 11a, thereby when the frames are reciprocally pushed one by the other, there will always be one frame in each chamber, which ensures the relative tightness of the latter. When the frames are not in contact one with another, the position of chambers 15 is so determined that there will always be a cell at right angles with each chamber presented by the furnace.

Should this arrangement be not feasible, temporary shutting means for port-holes worked out into chambers 11, 11a will be fitted, said temporary shutting means being cleared upon the incoming and the outgoing of any cell.

By referring again to FIG. 3, it appears that the lower longitudinal girder 19 of frame 17 holds, by means of keys 20, preferable flexible, and made for instance of expanded metal or folded corrugated iron sheets, a support sole plate 21 which bears on its side opposite to that resting on keys 20 projections 22 having a small section, at least at the tips thereof. Said projections may, for instance, be made of pins relatively close one another, the spacing between two projections ranging about 15 to 20 mm.

Projections 22 are so arranged that they bear at precisely settled points, one of the flanges 23 of a radiator core 24 for instance, whereof 25 represents the pipes, 26 the dissipator parts and 27 the collectors.

As shown on FIGS. 2 and 2a, when the frame 17 forming the setting of a cell is carried by conveyor 6, the core thereof is at right angle with the travelling direction of the hot gas, i.e. exactly in the same way a complete radiator will be used on an automobile, which means according to the best aerodynamic conditions. Thereby, the hot gas travel through all the parts of the core, evenly, the core acting as air travelling regulator by itself.

In order to maintain the various parts of the core properly pressed against each other, a pillar-plate 30 is fitted which is similar to sole-plate 21 and bears, like the latter, projections 22 set in the direction of the core so as to rest, for instance on the second flange 23a, and occasionally, on other parts of the core, for instance, on fixing clips which are brazed onto the flanges and, also, to tighten, if necessary, the flange tips on collector supports.

Pillar-plate 30 is vertically movable and is guided, for instance, by means of rods 31 running through holes worked out in girder 18, or by means of clamps added to said girder, and rods 31 are advantageously fitted with a head 32 in order to limit the travel of pillar-plate 30.

In principle, the weight of pillar-plate 30 is sufficient for maintaining properly in contact between them the various parts of the radiator, namely the flanges, the pipes and the dissipators in order that the "squeeze" of said parts, i.e. the respective position thereof and the pressure they exert one against the other, be satisfactory at the time the brazing is made. In addition, if so desired, calibrated springs 33 may, also, be set between the pillar-plate and the girder 18, for instance, in the case it is assumed that the weight of pillar-plate 30 is not sufficient for maintaining the required pressure between the various parts of the radiator to be brazed, which is particularly the case for large size radiators, since it is an important feature of the embodiment of the cells of invention that steps be taken with a view that sole-plate 21, as well as pillar-plate 30 and projections 22 carried by the latter be light in order to show a low thermal inertia, so as to reduce as much as possible heat conductivity between core 24 and the parts on which it rests for which, besides, it is advantageous that the said parts be not heated up to temperature prevailing in the various partitions of the furnace, at least in those the temperature thereof is the highest.

Owing to the fact pillar-plate 30 is pressed either merely by the weight thereof onto the core to be brazed, or by means of calibrated springs and that, besides, keys 20 which hold sole-plate 21 show, preferably, a certain elasticity, the differential expansions between aluminium, basic constituent metal of the radiator, and stainless steel, basic constituent metal of the various parts of the cell, are compensated by this method, the lengthwise differential expansion being, if necessary, compensated by a slight sliding of the cell parts and the core one with respect to the others.

Since it often happens that different types of radiator core have to be brazed in a same furnace and without modifying the cells, projections 22 are arranged so as not to be necessarily all used for holding purpose during the brazing of a given type of core.

Since sole-plate 21 is normally fixed and that pillar-plate 30, as well as, in case of need, pressing parts 33 are guided into the cell, spacing means for said pillar-plate and parts 33 may easily be designed so as to make self-acting the loading of the cells by using mechanical means for the setting and the extrusion of the cores.

Projections 22 are not necessarily formed of pin shaped parts, and FIG. 4 shows that said projections, which are shown on sole-plate 21, may be formed of cross-bars 37 the part 37a thereof, coming into contact with the core to be soldered, is thinned down and bears advantageously notches 38 intended to lessen the contact surface. The projections may also be formed of U shaped parts 39 with triangular apices 40 or even flat edges 41, the shape of the cross-bars or U shaped parts depending chiefly of the core parts which have to be held, for instance in the case said parts are fragile or when accessories have to be held against core flanges 23 or on other parts thereof.

Sole-plates 21 as well as pillar-plate 30 may also be formed of T shapes as shown on FIGS. 5 and 6 and, in this case, the web 42 of the shapes is cut out so as to show resting parts 43 and 44 having different forms, depending on the core parts over which said parts exert a pressure. FIG. 6 shows that, in this case also, web 42 may be thinned down at the tip thereof, as shown at 45, in order to lessen the contact surface.

Figure 7:
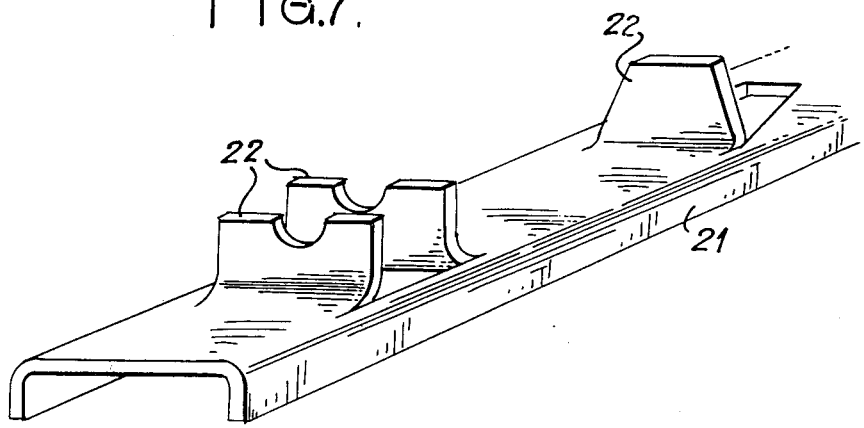
FIG. 7 shows another embodiment of the feature which appears on FIG. 4.

FIG. 7 shows another process for the making of sole-plate 21 and pillar-plate 30. In this case, a U shape is used and projections 22 are worked out by cutting and cambering, which provides small contact surfaces with the radiator core though said contact surfaces may be close to each other.

This arrangement has another advantage. As a matter of fact, by cutting out and cambering appropriately projections 22 from a U shape, it becomes possible to give them a certain set and, thereby, to pipe hot gas so they selectively are directed on certain parts to be brazed or to eliminate disturbances in the travelling of said hot gas.

Figure 8:
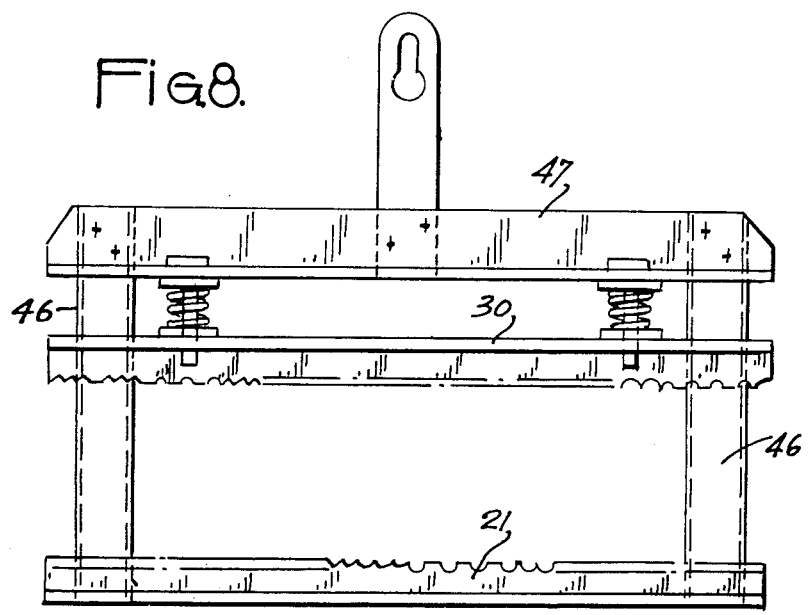
FIG. 8 shows a different form of the cell shown on FIG. 3.

In the case T or U shapes are used for the making of sole-plate 21 and pillar-plate 30, the cell may itself be simplified because these shapes have a great rigidity owing to the form thereof. In this case, as shown on FIG. 8, the sole-plate 21 constitutes the lower girder of the cell and is connected by struts 46 to another T or U shape 47 which constitutes the upper girder of the cell whereon is suspended pillar-plate 30, said suspension being made as described with reference to FIG. 3.

Figure 9:
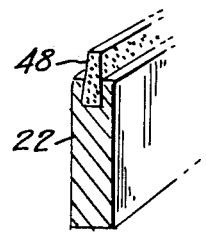
FIGS. 9 and 10 are diagrammatic perspective views showing additional features of the invention.
Figure 10:
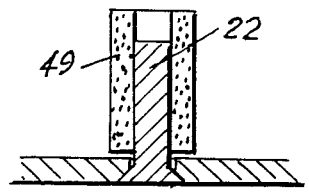

It has been found highly desirable not only to limit the heat conductivity between the core to be brazed and the cell holding it, but also to take such steps as the risks of adherence between the core, once brazed, and the projections of the cell be reduced as far as possible, or even entirely eliminated. This result may be obtained by following the process shown on FIGS. 9 and 10, i.e. that projections 22, 37, 39, when they are made of pins, are fitted, at the tips thereof, with bosses 48 or sleeves 49 made of a non-corrosive refractory material which does not draw the soldering; suitable materials are, for instance, ceramic or steatite.

As it appears from the foregoing, the supporting cells of the cores or radiators to be brazed on the one hand, show a low thermal inertia in the parts thereof which are close to the core and, on the other hand, include means which prevent almost entirely any heat transmission between them and the core and, further, allow hot gas to travel under the best aerodynamic conditions into all the core parts, thereby making it possible that all the core parts be heated at a fully homogeneous temperature.

The making of cells with a metal resisting to the corrosive action of soldering flux results in said cells may be used for the holding in position the constituent parts of the core during the course of the fluxing work itself, whether said work is made by means of bath or by gun spraying.

In the case the fluxing of the cores to be brazed is made by bath, the furnace, as shown on FIG. 1, delimits four areas or compartments A to D. On the contrary, in the case the core is fluxed by spraying, area A may be suppressed, since said area, which may be separated from the next area by a chamber contrarily to areas B to D, is chiefly used as a drying-oven and the temperature thereof ranges about 150°C. It, however, is possible, even in fluxing by spraying, to maintain area or compartment A in the furnace but in this case the furnace must be arranged in such way that said spraying fluxing be carried out in said compartment A, i.e. on the pre-heated core, the temperature then prevailing in said compartment A being close to the flux fluidifyzation temperature.

The length over which extend respectively the various areas of the furnace is settled in ratio to the moving speed of the cells and to the time during which the cores contained in the cells have to remain in each area for being heated at the desired temperature.

Compartment A, if any, serves, as indicated above, either as a drying-oven, or as a fluxing by spraying compartment and, in the case said compartment serves as a drying-oven, it has been found advantageous that the cores stay in said compartment during 10 to 60 minutes at a temperature ranging about 150°C in order that they become entirely dehydrated.

Area B is a pre-heating area and the cores to be brazed remain there during 10 to 20 minutes. The temperature at which are heated the core in this area depends directly on the nature of the brazing alloy. In the case said brazing alloy is a silicon-aluminium alloy having a 7.5 % silicon the temperature in area B is 570° ± 5°C; in the case the aluminium-silicon brazing alloy has a 12 % in silicon, the temperature may be only 550° ± 5°C.

Area C is the brazing area, properly so called, and, as an example, in said area the temperature is 615° ± 2°C in the case of the brazing alloy at 7.5 % in silicon but only 600° ± 2°C in the case of the alloy at 12 % in silicon.

Area D is used for pre-cooling and the temperature of the cores is lowered therein down to 300°C approximately so as to prevent the cores from being subjected to heat strokes which are prejudicial to good brazing.

As already indicated above, it is also of importance, according to the invention, that the travelling speeds of the hot gas in the various areas be properly regulated. As a matter of fact, it has been remarked that the flux deposited on the parts to be brazed has a tendency to be blown and carried away when the travelling velocity of the hot gas is too high. Generally, a velocity ranging about 4 m/s is suitable for most of the areas, however, it has been noted it is of importance that the brazing temperature, i.e. temperature in area C, be quickly reached. It has been established, surprisingly, that after the pre-heating in area B wherein the melting temperature of the brazing alloy is not reached, but wherein, however, the flux itself is molten, has flowed away and has been kept back by capillarity in the joints, i.e. just where the brazing can be made the best way, it becomes possible to increase fairly the travelling velocity of the hot gas.

To this end, is has been noted that, in area B, the travelling velocity of the hot gas should be limited at approximately 4 m/s, but however could advantageously reach 6 m/s in area C, enables reducing the time of the core in said areas, respectively at a duration ranging between 10 and 20 minutes for area B, and 3 to 5 minutes for area C, so that, during this short space of time, the risk of aluminium reoxidation is eliminated, and this all the more as a thin film of molten flux remains on all the surface of parts to be brazed thus preventing any oxidation.

The invention is not restricted to the embodiment examples shown and described in details, since various changes may be made which are contemplated as may come within the scope of the claims. In particular, the connection between ducts 9 and 9a may be executed in a different way, for instance, by setting duct 9b or pipes, either under the furnace, or laterally.

I claim:

1. A brazing jig for supporting a radiator to be brazed by progressive travel through a gas furnace in which streams of hot gas are blown transversely to the direction of travel through the furnace by said jig, comprising a rigid, generally rectangular frame, means for connecting said frame to a conveyor, a longitudinally extending base plate at the lower portion of said frame, said base plate having thin projections adapted to make substantially point contact with a radiator to support said radiator, and a top plate having thin projections similarly adapted to bear on said radiator, one of said plates being guided by said frame to be movable and resiliently urged towards said radiator, the front and rear faces of the radiator thereby being exposed when in said furnace to said blown hot gas blowing therethrough in the same manner as a coolant flows when the radiator is in actual use.

2. A brazing jig as claimed in claim 1, wherein said thin projections are pointed.

3. A brazing jig as claimed in claim 1, wherein said projections extend transversely with respect to said base and top plates.

4. A brazing jig as claimed in claim 1, wherein said projections are formed by bending material from said base and top plates.

5. A brazing jig as claimed in claim 1, wherein said projections are wedge-shaped and disposed parallel to the direction of the streams of hot gasses.

6. A brazing jig as claimed in claim 1, wherein said projections are made of ceramic.

7. A brazing jig as claimed in claim 6, wherein said ceramic is a steatite.

8. A brazing jig for supporting a radiator to be brazed by progressive travel through a gas furnace having inlet and outlet ports of a substantially rectangular form and in which streams of hot gas are blown transversely to the direction of travel through the furnace by said jig, comprising a rigid, generally rectangular frame of a form corresponding to that of said inlet and outlet ports whereby said frame is adapted in shape and size to form a closure element for the inlet and outlet ports of said furnace, means for connecting said frame to a conveyor, a longitudinally extending base plate at the lower portion of said frame, said base plate having thin projections adapted to make substantially point contact with a radiator to support said radiator, and a top plate having thin projections similarly adapted to bear on said radiator, one of said plates being guided by said frame to be movable and resiliently urged towards said radiator, the front and rear faces of the radiator thereby being exposed when in said furnace to said blown hot gas blowing therethrough in the same manner as a coolant flows when the radiator is in actual use.

9. A brazing jig for supporting radiators, each having an upper and a lower surface, said radiators adapted to be brazed by progressive travel through a gas furnace in which streams of hot gas are blown transversely to the direction of travel through the furnace by said jig, comprising a rigid, generally rectangular frame, means for connecting said frame to a conveyor, a longitudinally extending base plate at the lower portion of said frame, said base plate having thin projections adapted to make substantially point contact with a radiator to support said radiator, the top of said projections delimiting a surface corresponding to said upper surface of the radiator, and a top plate having thin projections similarly adapted to bear on said radiator, the top of said projections delimiting a surface corresponding to said lower surface of the radiator, whereby said projections are then shaped to correspond to several types or sizes of radiators, one of said plates being guided by said frame to be movable and resiliently urged towards said radiator, the front and rear faces of the radiator thereby being exposed when in said furnace to said blown hot gas blowing therethrough in the same manner as a coolant flows when the radiator is in actual use.

* * * * *